(12) United States Patent
Cheang et al.

(10) Patent No.: US 10,846,776 B1
(45) Date of Patent: Nov. 24, 2020

(54) ACCOUNT CUSTOMIZED ITEM LIST SYSTEM

(71) Applicant: Amazon Technologies, Inc., Seattle, WA (US)

(72) Inventors: Guillermo Auyon Cheang, San Diego, CA (US); Stephanie Derouet, Seattle, WA (US); Anwasha Dhar, Carlsbad, CA (US); Michael Giovanelli, San Diego, CA (US); Nolan Greene, Encinitas, CA (US); Jennifer Anne Hiatt, Seattle, WA (US); Timothy O'Connell, Seattle, WA (US); Xavier Tatarkiewicz, San Diego, CA (US); Spencer Lyle Voorheis, San Luis Obispo, CA (US); Yang Wang, Orange County, CA (US); John Weldon, San Diego, CA (US); Kristen Yagley, Seattle, WA (US); Michael Zahalan, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 15/925,424

(22) Filed: Mar. 19, 2018

(51) Int. Cl.
  *G06Q 30/06* (2012.01)
  *G06F 16/955* (2019.01)
(52) U.S. Cl.
  CPC ..... *G06Q 30/0631* (2013.01); *G06Q 30/0613* (2013.01); *G06Q 30/0635* (2013.01); *G06Q 30/0641* (2013.01); *G06F 16/955* (2019.01)
(58) Field of Classification Search
  CPC .......... G06Q 30/0631; G06Q 30/0635; G06Q 30/0613; G06Q 30/0641; G06F 16/955
  USPC .................................. 705/26.7, 26.8, 26.41
  See application file for complete search history.

(56) References Cited

U.S. PATENT DOCUMENTS

| | | | | |
|---|---|---|---|---|
| 8,600,835 | B1* | 12/2013 | Lueck | G06Q 30/0283 |
| | | | | 705/26.1 |
| 9,009,082 | B1* | 4/2015 | Marshall | G06Q 99/00 |
| | | | | 705/26.1 |
| 2006/0173838 | A1* | 8/2006 | Garg | G06Q 30/02 |
| 2011/0093311 | A1* | 4/2011 | Hariharan | G06Q 30/02 |
| | | | | 705/7.34 |

(Continued)

OTHER PUBLICATIONS

Improving Contextual suggestions using Open Web domain knowledge Samar, Thaer; Bellogin, Alejandro; De Vries, Arjen. CEUR Workshop Proceedings 1421: 3-9. CEUR-WS. (Jan. 1, 2015).*

*Primary Examiner* — Yogesh C Garg
(74) *Attorney, Agent, or Firm* — Kilpatrick Townsend & Stockton LLP

(57) ABSTRACT

Described herein is a system and techniques for implementing a single mechanism that, when activated, provides a list of items which is customized according to the user that activated the mechanism. In some embodiments, a list of item types may be received by the system. The system may identify a number of potential items for each of the item types in the list of item types. The potential items may be filtered based on configuration settings associated with the user in order to identify a most appropriate item for each item type in the list of item types. The user may then be provided with a list of items that includes the most appropriate item for each item type. In some embodiments, the user may be provided with the ability to complete a transaction for one or more item in the list of items.

15 Claims, 10 Drawing Sheets

(56) References Cited

U.S. PATENT DOCUMENTS

| | | | |
|---|---|---|---|
| 2011/0295990 A1* | 12/2011 | St. Jean | G06F 16/9566 709/223 |
| 2015/0012616 A1* | 1/2015 | Pearl | G06Q 10/101 709/219 |
| 2015/0294377 A1* | 10/2015 | Chow | G06Q 30/0263 705/347 |
| 2018/0039989 A1* | 2/2018 | Beye | G06Q 20/40145 |
| 2019/0163758 A1* | 5/2019 | Zhivotvorev | G06F 16/285 |

* cited by examiner

ACCOUNT CUSTOMIZED ITEM LIST SYSTEM

BACKGROUND

As the amount of digital commerce continues to increase with the growth of the Internet, competition for customers is becoming increasingly fierce. Hence, it is becoming increasingly important for participants in digital commerce to seek new avenues for presenting their products to consumers.

Additionally, a number of websites provide detailed instructions for using or combining various items. However, these websites are often targeted toward all Internet users, which typically comprises a very large, and very broad, audience. Hence, mechanisms for obtaining items discussed by the websites may not be suitable for some individuals that fall outside of the target audience.

Embodiments of the present disclosure address these problems and other problems, individually and collectively.

BRIEF DESCRIPTION OF THE DRAWINGS

Various embodiments in accordance with the present disclosure will be described with reference to the drawings, in which.

DETAILED DESCRIPTION

In the following description; various embodiments will be described. For purposes of explanation, specific configurations and details are set forth in order to provide a thorough understanding of the embodiments. However; it will also be apparent to one skilled in the art that the embodiments may be practiced without the specific details. Furthermore, well-known features may be omitted or simplified in order not to obscure the embodiment being described.

Techniques described herein include a system and techniques by which a single mechanism may be used to provide different lists of items that are customized for each user that selects the mechanism. In some embodiments, the mechanism is an embedded list of item types that, when provided to a service provider, is processed in accordance with information related to the user that selected the mechanism. In some embodiments, one or more configuration settings may be stored in association with a user account that indicate item restrictions; item preferences, or any other suitable item selection criteria. Upon receiving a set of item types with respect to a user, the system may identify that user, retrieve one or more configuration settings associated with that user (e.g., stored within an account associated with the user) and select appropriate items that correspond to each of the item types in the set of item types based on the configuration settings.

By way of illustration, consider a scenario in which the system is implemented by an electronic retailer that provides food products. In this scenario, a recipe website (which may be hosted by a third-party entity) may provide a list of ingredients needed, quantities of the ingredients needed, and instructions for combining those ingredients. In this example, the recipe website may include a button that, when activated, links the user that activated the button to the described system. To do this, the button may link the user to the system by providing a URL that includes a list of item types (which may be ingredients for the recipe) to the user device from which the button was selected. This may redirect the user device to a webpage hosted by the system. The system, upon receiving the UAL and when creating the webpage to be presented, may parse the URL to identify each of the ingredients needed as well as a quantity of that ingredient needed. The system may also identify the user that selected the button. In this example, the system may automatically (e.g., without user interaction) generate a list of specific items that correspond to the received list of ingredients that also corresponds to user settings for the user. This enables the user to quickly purchase a set of ingredients that matches the recipe on the recipe website that conforms to the user's dietary constraints.

Figure 1:
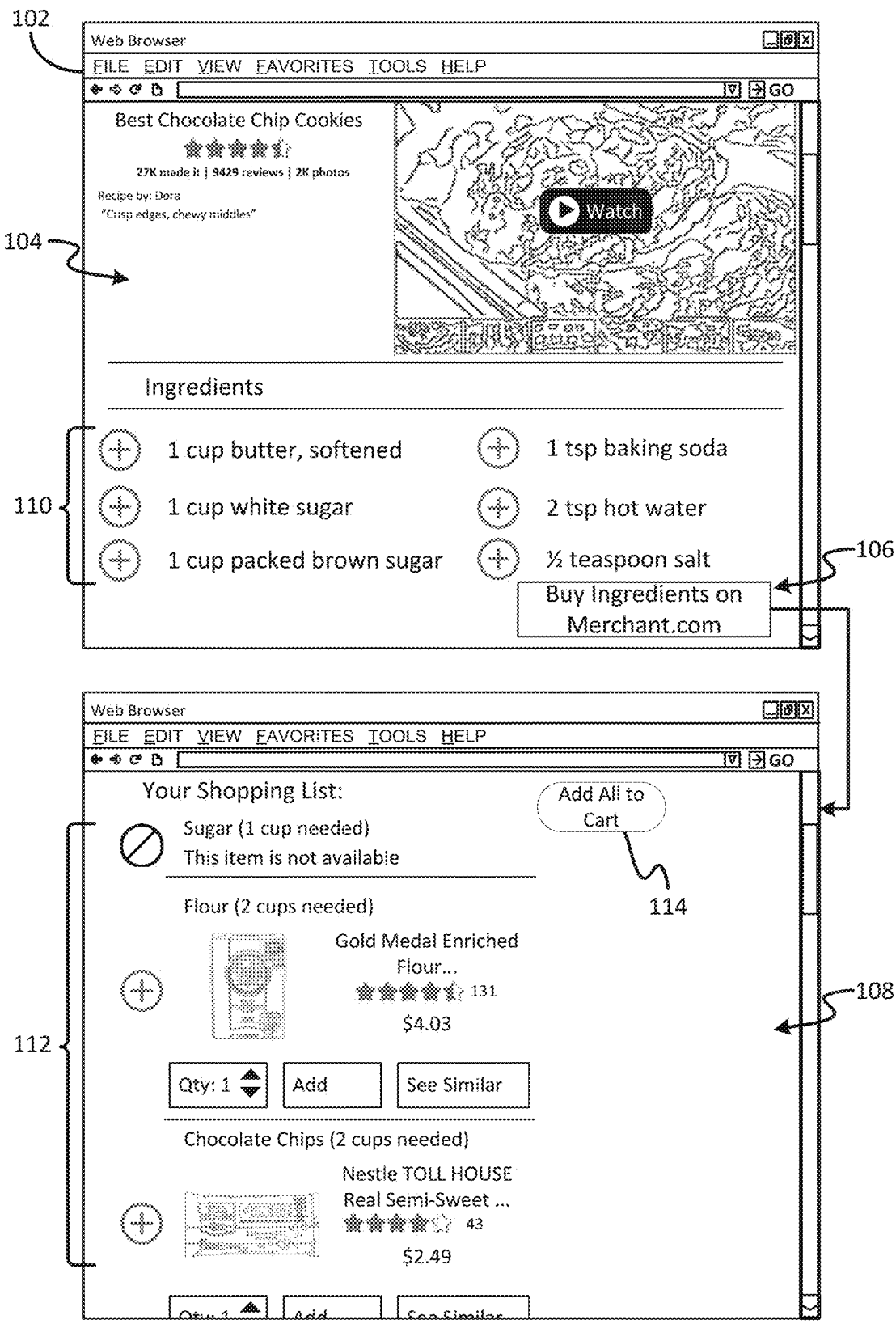
FIG. 1 depicts an example of an interaction that may occur in accordance with at least some embodiments described herein.

FIG. 1 depicts an example of an interaction that may occur using at least some embodiments of the system described herein. In FIG. 1, the interaction is illustrated by means of information displayed by a graphical user interface (GUI) at different points in time. In particular, FIG. 1 depicts information displayed upon a GUI of a web browser 102.

In some embodiments, information provided by multiple entities may be displayed by the GUI either at different times or concurrently. For example, a first website 104 hosted by a first entity may include an activation mechanism 106 that, when selected, causes presentation of a second website 108 hosted by a service provider. In some embodiments, the content presented on the second website 108 may be at least partially dependent upon an address or link associated with the activation mechanism 106 used to access the second webpage 108. In some embodiments, a list of item types 110 on the first webpages 104 may correspond to a list of items 112 presented on the second webpage 108. In some embodiments, the service provider may provide a mechanism 114 to obtain each of the list of items 112.

In some embodiments, the first entity may be any computing device configured to host a webpage 104 that includes an indication of one or more item types. It should be noted that the item types may be indicated with any degree of specificity. For example, one or more item types may be indicated with a high degree of specificity (e.g., particular brands, versions, etc.) or with a low degree of specificity (e.g., a general category of item). An example of a low-specificity item type may be "butter," whereas a highly specific item type may be "ABC brand unsalted butter." It should be noted that any item type may be indicated with any level of specificity/breadth. For example, an item type may be indicated as being "unsalted butter," which is more specific than an item type of butter, but less specific than an item type of ABC brand unsalted butter.

In some embodiments, the service provider may be any computing device configured to provide a service in which specific items are presented that correspond to the one or more item types indicated by the first entity as well as to enable a user to obtain those specific items. For example, upon selection of an activation mechanism 106, the web browser may be redirected to a webpage hosted by the service provider. In some embodiments, the one or more items may be indicated within the redirect request. For example, selection of the activation mechanism 106 may result in a link (e.g., a uniform resource locator (URL)) being provided to the web browser that includes indications of each of the one or more items. In this example, the indications of the one or more items may be provided to the service provider as parameters in the URL, Upon receiving the indications of the URL, the service provider may parse the URL to identify each of the one or more items indicated. The service provider may then identify, using one or more techniques described in greater detail below, appropriate items to be presented that correspond to each of the indicated item categories.

In some embodiments, the service provider may be an electronic retailer that maintains a digital catalog of items available for purchase from that retailer. The service provider may maintain a number of user accounts, each of which is associated with a user of the electronic retailer. In some embodiments, upon receiving a list of item types (and potentially quantities) from the first entity, the service provider may identify a number of appropriate items corresponding to each of the item types, filter those items by availability (e.g., based on geographic location) and quantity, further filter those items based on preferences stored in or otherwise associated with the user accounts, and may select a most appropriate item for each item type.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via, any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
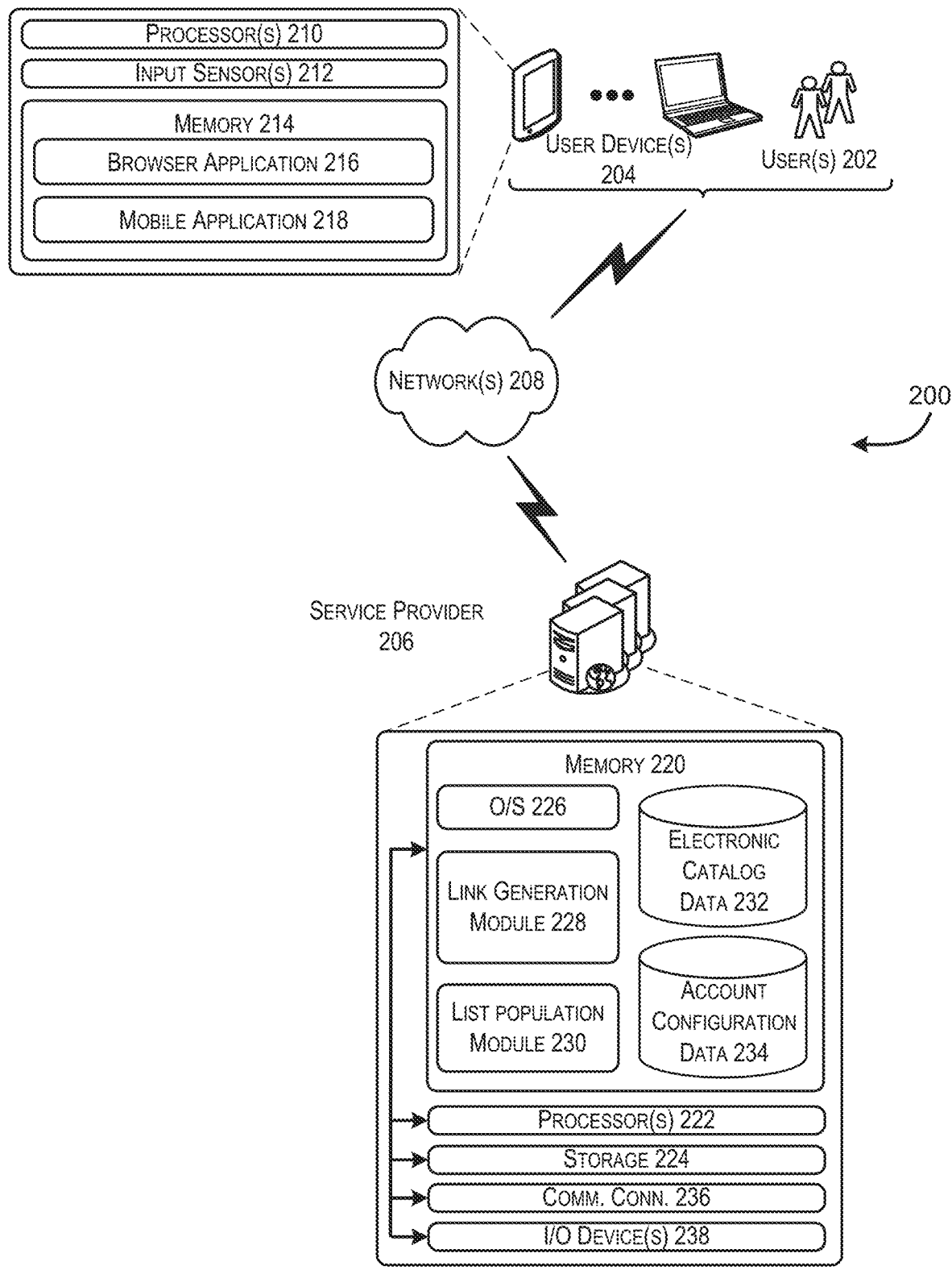
FIG. 2 depicts an illustrative example of a system or architecture in which techniques for presenting a customized list of items may be implemented.

FIG. 2 depicts an illustrative example of a system or architecture 200 in which techniques for presenting a customized list of items may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. In some embodiments, the memory 214 may also include a mobile application 218 that is capable of presenting information related to a customized list of items to a user. Although sample architecture 200 depicts a mobile application 218 as being included in the contents of the memory 214 of the user device 204, at least a portion of the functionality described as being performed by the mobile application 218 may be performed by an entity external to the user device 204 (e.g., service provider 206).

In some embodiments, the mobile application 218 may be configured to provide access to a customized list of items provided by the service provider 206. For example, the user 202 may visit a website hosted by a third-party entity (e.g., an entity not directly affiliated with the service provider) using the browser application 216. The website may include a mechanism, which, when activated by a user causes the mobile application 218 to be launched (executed) on the user device 204. In this example, the mobile application 218 may be provided, during its launch, with a list of item types. The mobile application 218 may be configured to convey the list of item types to the service provider 206 and receive a list of items that correspond to each of the item types in the list. The user 202 may then be presented with an option to complete a transaction to obtain at least a portion of the presented items. It should be noted that some embodiments of the disclosure may not include a mobile application 218. For example, a user may access a third-party website using a browser application 216 and may be presented with the list of items received from the service provider within that browser application 216.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206 and/or third-party websites, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, such as social networking sites, electronic retailers, informational sites, blog sites, search engine sites, news and entertainment sites, and so forth. As discussed above, the described techniques can similarly be implemented outside of the browser application 216, such as with other applications running on the user device 204 (e.g., mobile application 218).

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for generating links to include item types (link generation module 228) as well as a module for populating a customized list of items (list population module 230). The memory 220 may also include electronic catalog data 232, which provides information for a number of different items, as well as account configuration data 234, which provides information related to user preferences or other account-specific details. In some embodiments, the electronic catalog data 232 and/or the account configuration data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 236 that allow the service provider 206 to communicate with a stored database, another computing device or server, user terminals, and/or other devices on the network(s) 208. The service provider 206 may also include input/output (I/O) device(s) and/or ports 238, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing electronic catalog data 232 and/or a database containing account configuration data 234 and the one or more application programs or services for implementing the features disclosed herein, including a link generation module 228 and/or a list population module 230.

In some embodiments, the link generation module 228 may be configured to, in conjunction with the processors 222, receive an indication of one or more items or item types and generate a link that indicates the one or more item types. The link generated by the link generation module 228 may be one that causes the service provider 206 to, upon its receipt, generate a customized list of items that correspond to item types included in the link. In some embodiments, the link generation module 228 may generate a uniform resource locator (URL) link that includes a single line which indicates a domain maintained/operated by the service provider as well as each of the item types. In these embodiments, the item types may be included as parameters. In some embodiments, one or more portions of the link may be presented in a format easily consumable using program code. For example, the item types may be formatted using a JavaScript Object Notation (JSON) format. In some embodiments, the link may also include an indication that the link is to be processed by the list population module 230. For example, a portion of the link may direct a website browser application to access a website on which functionality of the list population module 230 can be accessed. In some embodiments, the link generation module 228 may generate a link to include a service provider domain followed by information on item types and quantities. The item types and quantities may be provided to the link generation module 228 by a user. For example, a user wishing to implement the functionality described herein may access a website maintained by the service provider 206. The user may provide a list of item types and quantities to the service provider 206 via the website. The service provider 206, in response to receiving the list of item types and quantities, may generate a link that includes the information using the link generation module 228. Once generated, the user may link a button on his own website to the service provider 206 using the provided link. This allows the user to direct any of his or her own website visitors to the service provider's website, upon which each of those users may be presented with a custom list of items that corresponds to the list of item types.

In some embodiments, the list population module 230 may be configured to, in conjunction with the processors 222, identify appropriate items which correspond to the item types received in a link. In some embodiments, the list population module 230 may receive a link, or a portion of a link, generated by the link generation module 228. The list population module 230 may parse the received portion of the link to identify each of the item types in the list of item types as well as appropriate quantities (or measurements). To do this, the list population module 230 may filter a number of items that fall within an indicated item type. For example, the list population module 230 may receive an indication of a user's geographic location via an internet protocol (IP) address used to access the service provider website) and may filter out any items which are not available in that user's geographic region. Additionally, items may be filtered out if they include too little or too many of an item with respect to an indicated quantity. Once this initial filter has been performed, the list population module 230 may further filter a list of potential items that correspond to a particular item type based on configuration settings associated with an account. For example, the list population module 230 may identify user preferences or restrictions that dictate which items from a list of potential items are appropriate. Once the list of appropriate items has been generated for a particular item type, the list population module 230 may select a most appropriate item based on some weighted category. For example, the list population module 230 may select the least expensive item or the highest rated item. A most appropriate item may refer to any item which, given the service provider's knowledge of the user, the service provider determines that the user is most likely interested in out of the items available. The process above may be repeated by the list population module 230 for each of the item types in the list of item types in order to generate a list of items corresponding to that list of item types. The list population module 230 may then be configured to provide the list of items to the user device 204 from which the link was received. For example, the list of items may be presented on a website operated by the service provider 206, which may be viewed using the user device 204.

Figure 3:
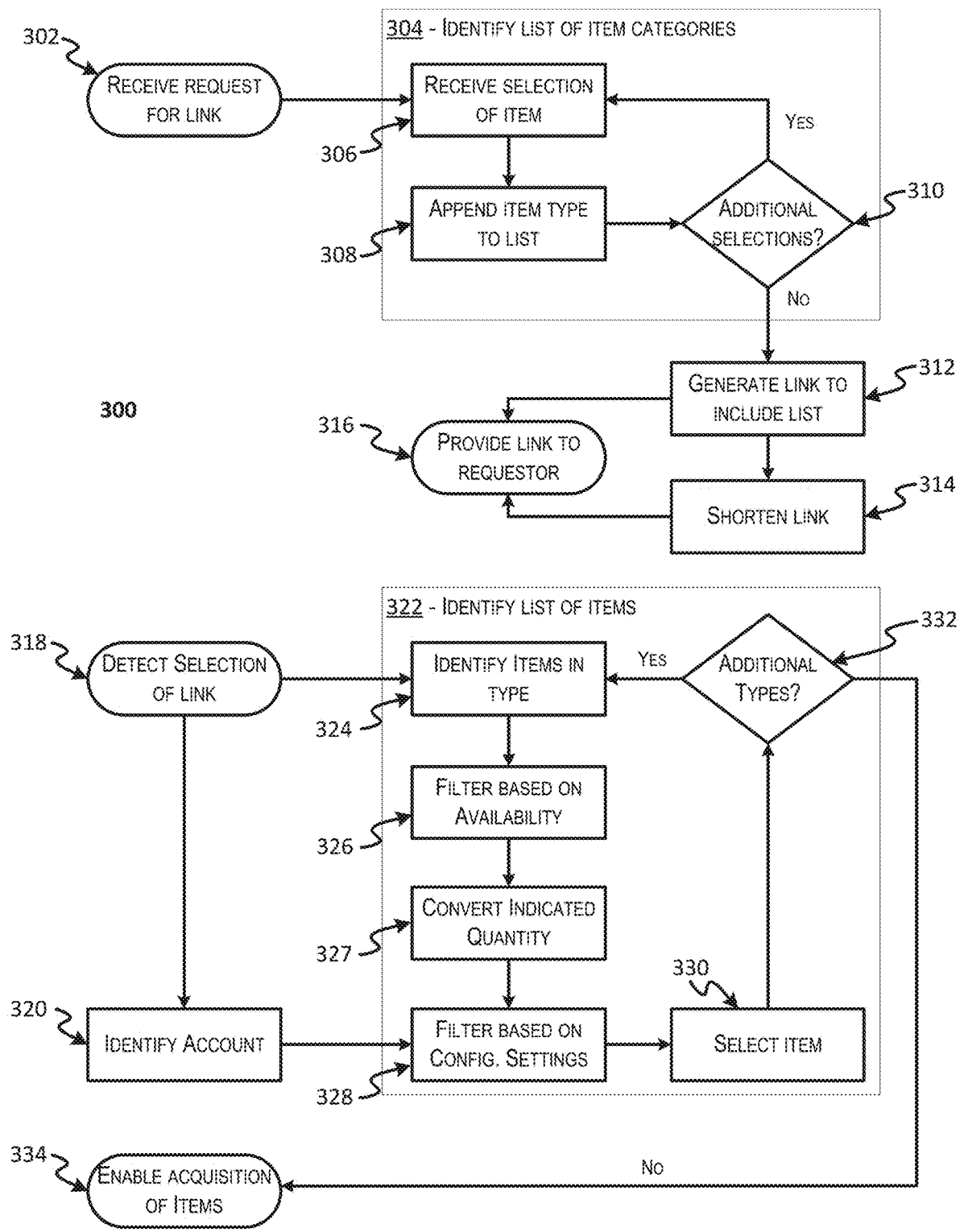
FIG. 3 depicts an illustrative flow chart demonstrating an example process for generating customized item lists in accordance with at least some embodiments.

FIG. 3 depicts an illustrative flow chart demonstrating an example process for generating customized item lists in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when a request is received for a link to a customizable list of items. 1111 some embodiments, the request may be received by the service provider via a user interaction with a website operated by that service provider. For example, a user may visit a website operated by the service provider and may select a button to initiate a request for a link.

In some embodiments, a link may be generated via a subprocess 304. In subprocess 304, the user may select a number of item types to be provided in a list at 306. In some embodiments, the user may select specific items (e.g., products) from an electronic catalog and the service provider may translate those specific items into item types. In some embodiments, the user may select types of items (e.g., from a drop down menu). In some embodiments, the user may also select or provide one or more attributes of information to be associated with the item type. For example, the user may select a particular amount or quantity to be associated with the item type. In this example, the user may select 1 cup of sugar. In some embodiments, the selection of information associated with an item type may be made separately from the selection of the item type (e.g., via separate drop-down menus). In some embodiments, the user may provide one or more pieces of information to be associated with the item type via a text input box or some other means of receiving unstructured data. For example, in a scenario in which the item types are associated with ingredients in a recipe, the user may provide instructions for preparing a particular ingredient. These instructions may be associated with the generated link via metadata. In another example, the user may provide or select an image to be associated with a particular item type. In this example, an identifier for that image may be added to the link.

In some embodiments, each item type and quantity may be appended to the list at 308 as it is selected by the user. In these embodiments, subprocess 304 may be repeated for each additional item selection as it is made at 310. In some embodiments, all of the selected item types may be added to the list at once upon selection of a mechanism to generate a link.

Once a list of item types has been generated using the subprocess 304, that list may be used to generate a link at 312. In some embodiments, the link may be a URL or other locator that may link a user to a particular location or website. The link may be generated to include a domain that corresponds to the service described herein, which may be one of multiple services provided by a service provider. In some embodiments, the link may include a list indicator to be used by the service provider to determine that the link pertains to a list of item types. There are a number of techniques in which a list of item types and quantities may be included within a link. For example, in some embodiments, the list of item types may be provided via a parameter or via a list of parameters in the link. A parameter may be any means of passing data to a host of a website via a link. One example of parameters are URL parameters, which typically includes key-value pairs which are separated by an equal sign (=) and joined by an ampersand (&). For example, in the scenario in which the user has selected items types that include 1 cup of flour and 2 cups of chocolate chips, an example link that includes URL parameters may look like: www.merchant.com/shoplist?itemtype1=flour&qty1=1cup&itemtype2=chochip&qty2=2cup . . . . In some embodiments, the link may also include an indication of the link's requestor. For example, the link may include an identifier associated with the requestor of the link that may be used to provide commission to that requestor each time that a purchase is conducted using the generated link.

In some embodiments, the link may be shortened at 314. For example, the generated link may be long or the service provider may not wish to expose details of the link. In these embodiments, a shortening entity (either the service provider or a different entity) may map the link to a shortened version of that link so that when the shortened version of the link is selected, the user is first routed to the shortening entity, which then replaces the shortened version with the full link and reroutes the user to the website operated by the service provider. Once the link, or its shortened version, has been generated, it may be provided to the requestor at 316. The requestor may then embed the link into a webpage that he or she operates in order to provide access to a customizable list via the link.

At 318, the process may continue when the service provider detects a selection of the generated link. In some embodiments, the process may involve identifying an account associated with the user that selected the link at 320. For example, the service provider may maintain an account associated with the user. Further to this example, the user device from which the link was accessed may contain an Internet cookie that indicates a login or other identifier for the user that has been placed on the user device by the service provider. In this example, the service provider may automatically log the user into his or her account or at least identify the user based on the internee cookie. In some embodiments, the service provider may request that the user log into an account maintained by the service provider by providing login credentials.

Upon detecting selection of the link, the service provider may generate a list of items by invoking subprocess 322. In subprocess 322, the service provider may parse the received link to identify the list of item types and quantities. For each of the identified item types, the service provider may identify a number of potential items that fit within that item type at 324, The potential items may then be filtered based on a number of criteria. In some embodiments, the potential items may first be filtered based on geographic availability or quantity at 326. For example, the service provider may receive an indication of a geographic location or region from which a user has accessed a link (e.g., an IP address). In this example, the service provider may remove potential items from the list of items which are unavailable in the geographic region from which the user has accessed the link.

In sonic embodiments, the list of potential items may also be filtered based on the indicated quantity. This may involve converting an amount of the item indicated as being needed in the item list into some standard, or commonly used, metric at 327. For example, if flour is typically stored in units of ounces, then an indication of 2 cups of flour may be converted into 8.5 ounces of flour. It should be noted that different item types, and even different items within an item type, may be associates with different conversion rates. For example, 1 pound of all-purpose flour may convert to 3⅓ cups, whereas 1 pound of cake flour may convert to 4½ cups. In some embodiments, a conversion rate between various types of metrics may be maintained with respect to a particular item. In some embodiments, a default conversion rate may be maintained with respect to an item type. In these embodiments, the system may first attempt to convert the metric units in accordance with a conversion rate for the particular item, and if a conversion rate for the particular item is unavailable, then the system may use the default conversion rate for the item type. In some embodiments, the system may filter out items that include that less than or more than some predetermined threshold quantity. For example, if the quantity of an item type is indicated as being 4 cups, items which include less than 2 cups (e.g., less than 50% of the indicated quantity) may be filtered out of the list of potential items.

In some embodiments, the list of potential items may be further filtered based on configuration settings. In some embodiments, an account may be associated with one or more configuration settings that indicate which items are most appropriate for one or more item types. In some embodiments, the configuration settings may indicate one or more items that must be filtered out. For example, a user may provide a configuration setting that indicates an allergy or aversion to a particular item or type of item. In this example, items that conform to that configuration setting (include the indicated allergen) may be filtered from a list of potential items and/or replaced with substitute items. For example, if the service provider is an electronic retailer that provides food products, the service provider may maintain, with respect to each item, a list of ingredients in that item. In this example, if a user indicates that he or she is allergic to peanuts, then the service provider may filter out any items that include peanuts or peanut oil as an ingredient. In some embodiments, the user may provide a configuration setting which indicates items or types of items which are acceptable. For example, the user may provide an indication of a particular diet so that any items not within that diet may be filtered out of the list of potential items.

Once a list of potential items for a particular item type has been filtered based on the configuration settings, a most appropriate item may be selected from that list of potential items at 330. In some embodiments, the configuration settings may include user preferences that are used to identify a specific item from the list of potential items. For example, the user may have previously indicated a preference for ACME brand items. In this example, the service provider may select the ACMF brand version of the item type when it is available.

In some embodiments, each item in a list of potential items may be weighted based on attributes associated with that potential item. For example, the user may indicate a preference toward "organic" items, such that the service provider may assign a higher weight to organic items when selecting an appropriate item of the potential items to be presented. In some embodiments, the user may indicate one or more factors that should be given greater weight during this selection process. For example, the user may indicate that selection of the item to be presented from the list of potential items should be made based first on price, and then on item rating. In this example, the lowest priced item will be selected from the potential items, unless there is a tie, in which case the highest rated of the lowest priced items will be selected.

Subprocess 322 may be repeated for each item type identified from the link at 332 to identify a most-appropriate item for each of the item types in the list of item types. Once the completed list of items has been generated, that list may then be presented to the user that selected the link. In some embodiments, the service provider may enable acquisition of one or more of the items at 334. For example, the service provider may enable the user to place one or more of the items into an electronic shopping cart, from which a purchase transaction may be completed.

Figure 4:
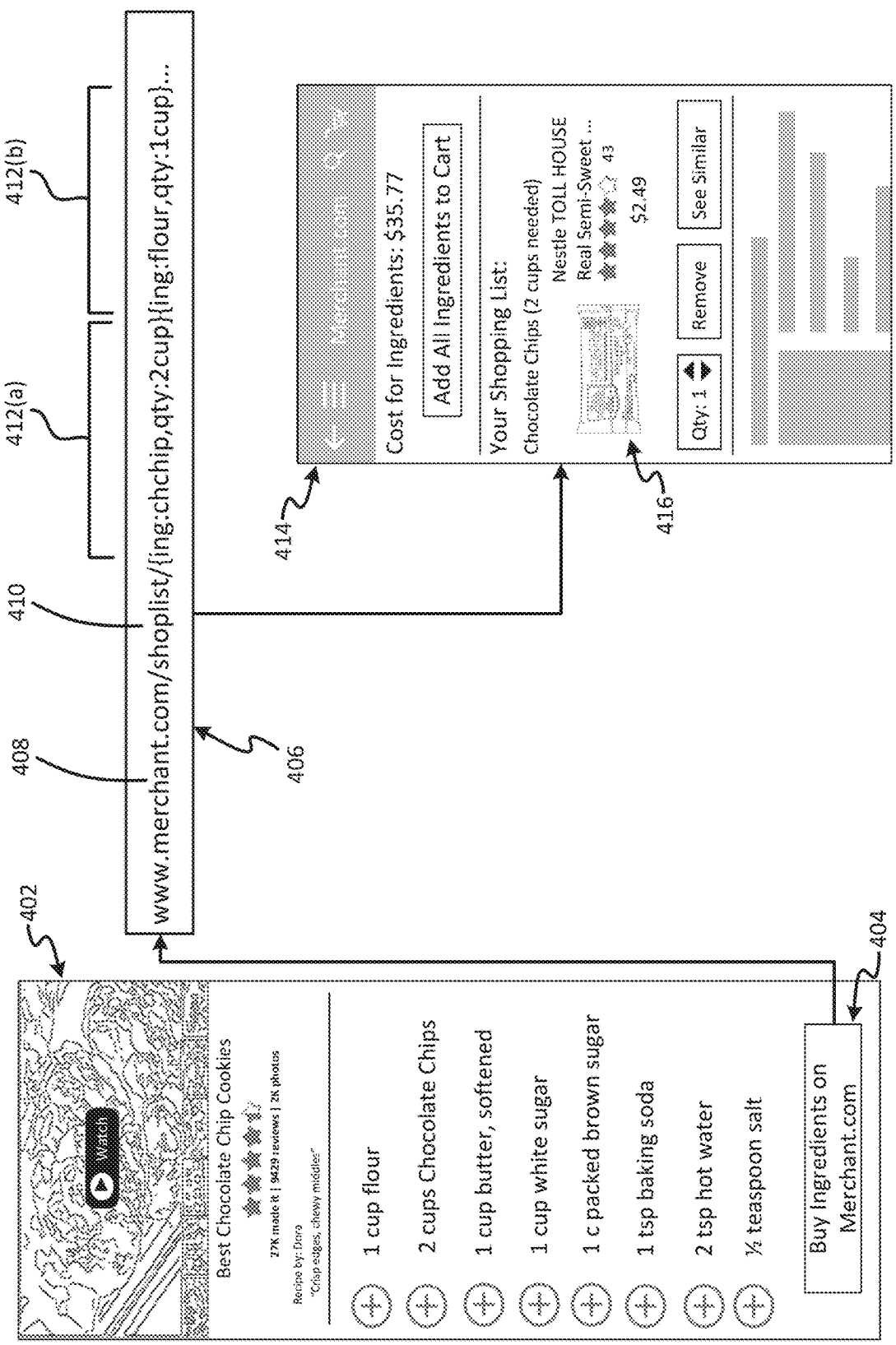
FIG. 4 depicts a flow diagram showing an illustrative example process for generating a list of items in accordance with at least some embodiments of the system described herein.

FIG. 4 depicts a flow diagram showing an illustrative example process for generating a list of items in accordance with at least some embodiments of the system described herein. In FIG. 4, a GUI 402 is depicted as displaying a website. The GUI may be caused to be presented by a browser application as described elsewhere. The website may include, among other things, a mechanism 404 that, when activated, causes at least a portion of the functionality described herein to be executed. As depicted by the arrow from mechanism 404 to link 406, upon activation of the mechanism 404, the user device upon which the browser application has been instantiated may be provided with a link 406. In some embodiments, the link 406 may cause the browser application to be redirected to a second website. In some embodiments, the link 406 may cause a mobile application to be executed on the user device.

In some embodiments, the operator of the website in 402 may have previously requested to be provided with a link 406 which the operator may have then embedded into the mechanism 404. An example process for generating the link 406 is described in greater detail with respect to FIG. 3 above. In some embodiments, the link 406 may be a single line. The link may consist of a number of sections, including a domain 408, a path 410, and a list of item types 412. The domain 408 may be any indication of the service provider. The path 410 may include any indication of a location of a resource capable of performing at least a portion of the functionality described herein. The list of item types may include any indication of a list of item types for which the service provider should generate a custom list of items. In some embodiments, the list of item types 412 may be provided in an array or list. In some embodiments, the list of item types 412 may be provided as a series of key-value pairs. In some embodiments, the list of item types 412 may be presented as a series of JSON data objects, such as 412(a) and 412(b).

As depicted by the arrow from the link 406 to screenshot 414, may cause a user device to access an item list 416 provided by a service provider. As described elsewhere, the item list 416 may be accessed via a browser application or via a separate mobile application. The item list 416 may be caused to generate a list of items 416, each of which correspond to one of the item types 412 in the list of item types. In some embodiments, the item list 416 may enable a user to perform a transaction with respect to each of the displayed items 416.

Figure 5:
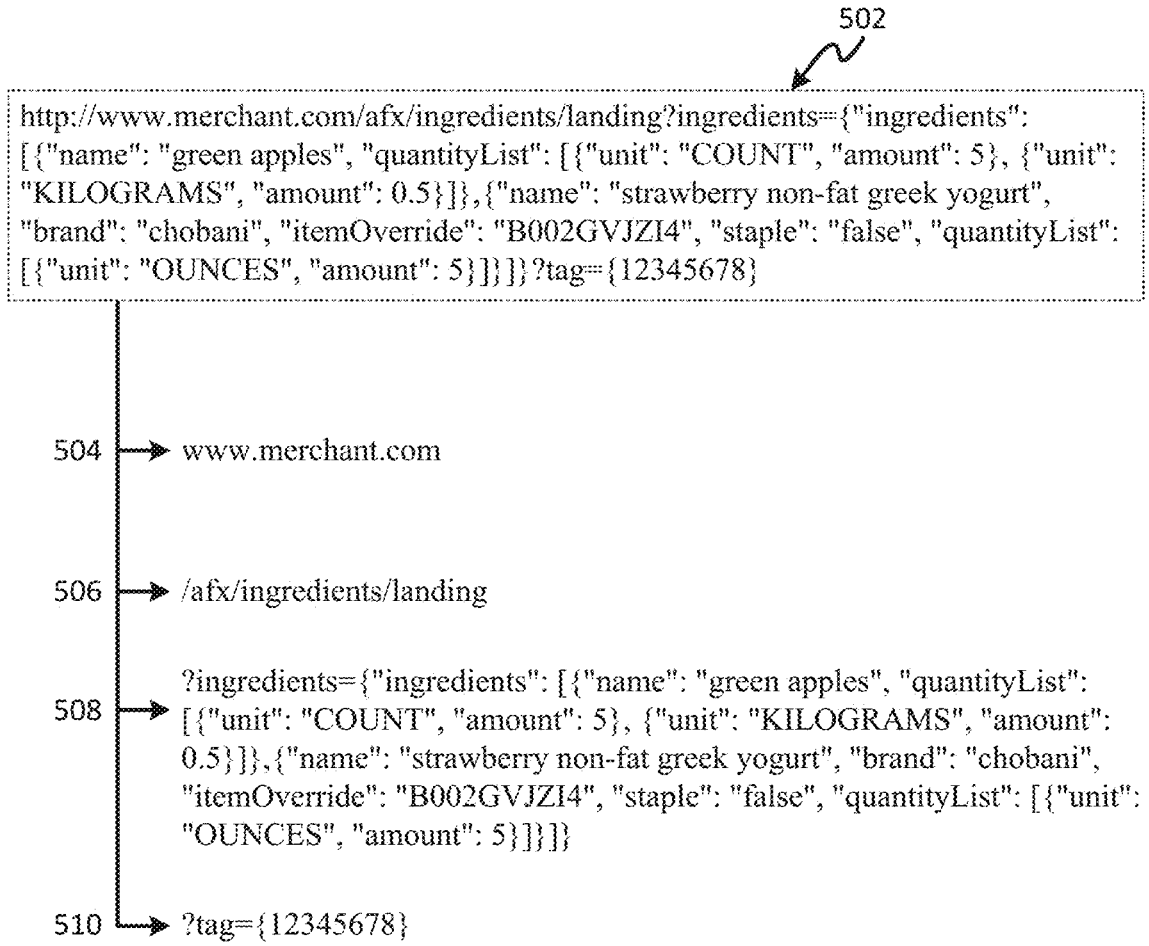
FIG. 5 an illustrative example of a link that may be generated and used in accordance with at least some embodiments of the system described herein.

FIG. 5 an illustrative example of a link that may be generated and used in accordance with at least some embodiments of the system described herein. In FIG. 5, the example link 502 is presented as an unencoded URL (e.g., wherein the indicators include plain word keywords). It should be noted that the depiction of an unencoded link in FIG. 5 is for illustrative purposes only and the actual link may be encoded and/or shortened in some embodiments.

A link 502 may be generated to consist of a number of components. FIG. 5 illustrates examples of some typical components that may be included in a link generated using techniques described herein. However, it should be noted that the link 502 may include more or less components than are illustrated here. Each of the illustrated components are broken out via arrows below link 502 for easier illustration. In particular, the link 502 is depicted as including a domain name 504, a resource path 506, a list of item types 508, and additional parameters 510.

The link 502 may include a domain name 504. A domain name 504 may include an indication of a provider of the service described herein. For example, the domain name 504 may indicate an address or location of a service provider the service provider 206 as described with respect to FIG. 2).

In some embodiments, the link 502 may also include a resource path 506. A resource path may indicate a location (within the domain) at which a resource is located. In some embodiments, the resource path 506 may indicate a "landing" webpage from which one or more resources can be accessed. For example, one or more of the processes described herein may be accessed via a particular landing page within a domain. In this example, each time that the domain host (e.g., the service provider) receives a request to serve a network document via a link that includes that landing page, the domain host may automatically use one or more of the techniques described herein to process that link and generate the network document based on the received link.

The link 502 may include a list of item types 508. In some embodiments, the list of item types 508 may be included as a parameter value. For example, as indicated by the "?ingredients=" the list of item types 508 may be presented as a value for the parameter "ingredients." In the example link 502 depicted, the list of item types 508 can be translated to:

```
{
  "ingredients": [
    {
      "name": "green apples",
      "quantityList": [
        {
          "unit": "COUNT",
          "amount": 5
        },
        {
          "unit": "KILOGRAMS",
          "amount": 0.5
        }
      ]
    },
    {
      "name": "strawberry non-fat greek yogurt",
      "brand": "chobani",
      "itemOverride": "B002GVJZI4",
      "staple": "false",
      "quantityList": [
        {
          "unit": "OUNCES",
          "amount": 5
        }
      ]
    }
  ]
}
```

In this example, the list of item types 508 may include a number of metadata to be provided to a service provider via the link 502. In addition to an indication of a particular type of item, the list of item types 508 may include various details that may be used in the process described herein to identify a particular item for that item type. For example, the list of item types 508 may include a brand indicator that indicates a preference toward, or a value weighted toward, a particular brand or version of item type. In some embodiments, a brand indicator may be optional, in that if the indicated brand or version is not available, an alternative brand or version may be selected. In some embodiments, the list of item types 508 may include an item override value for a particular item. In these embodiments, an item override value may be used by the system to identify a particular version item for that item type that should be presented regardless of techniques that may be used by the system to select a most appropriate item. In some embodiments, the list of item types 508 may include a staple flag that indicates whether the item type is a staple. In some embodiments, the system may be configured to not present a most appropriate item for an item type that is identified as being a staple. For example, it may be assumed that a user that requests a list of items may already have any items identified as being a staple. The list of item types 508 may also include, for one or more item types, a quantity or amount to be associated with the item type. A quantity or amount may be indicated using any suitable metric. For example, a quantity of an item type may be indicated as an amount of mass, a weight, a volume, or a number of the item. In some embodiments, the system may convert an amount provided by the user with respect to the item type using a first metric type into a different, but equivalent, amount of the item in a second metric type. In some embodiments, a quantity indicator may include either a metric provided by a user or a metric converted by the system from the metric provided by the user.

The link 502 may include additional parameters 510. Additional parameters 510 may include any information to be conveyed to the system with respect to the link. In sonic embodiments, the additional parameters 510 may include an indication of an originator for the request. For example, the additional parameters 510 may indicate a website from which the request was generated. In some embodiments, the system may be configured to track originators from which requests are received (e.g., in order to provide commission, etc.).

Figure 6:
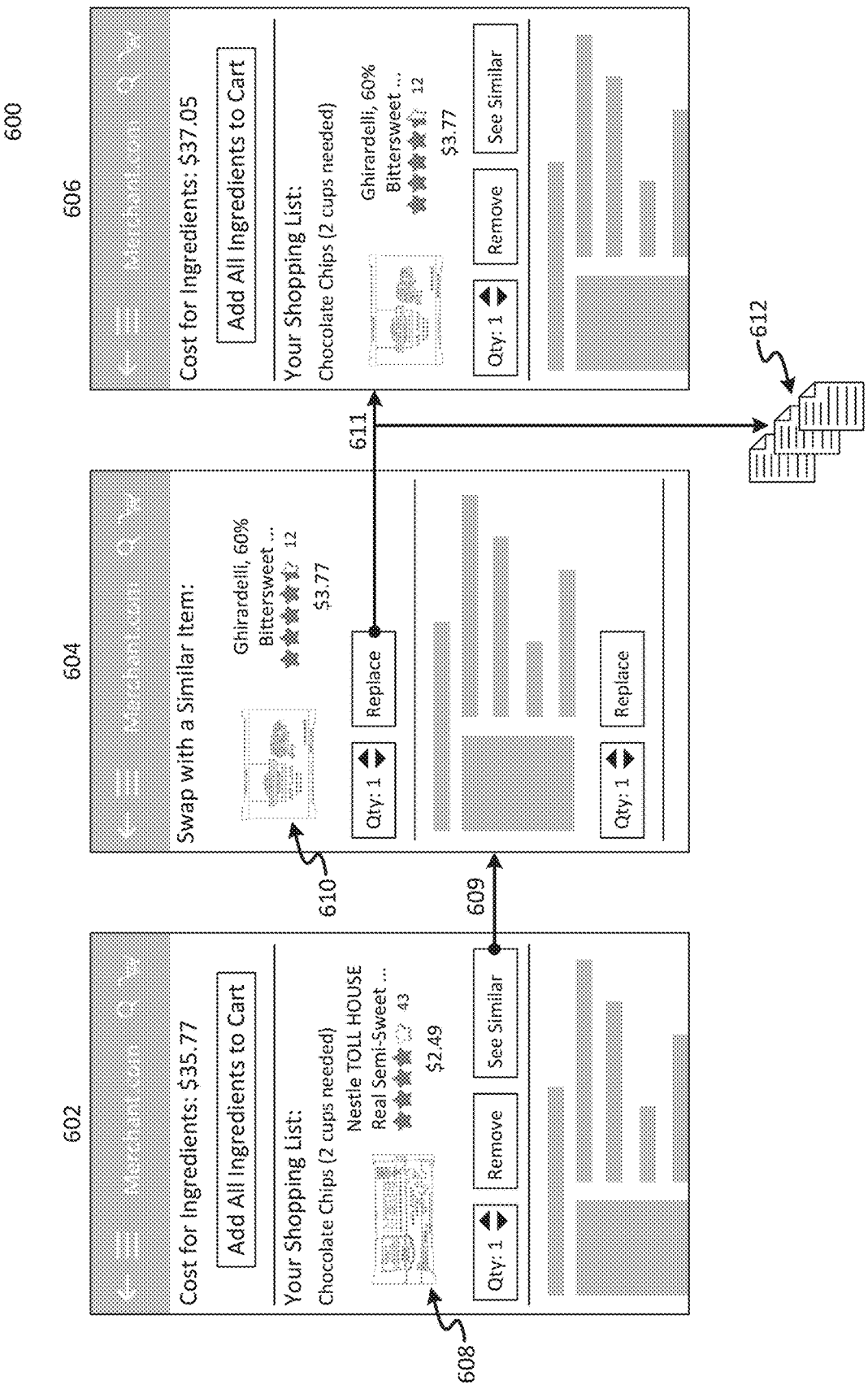
FIG. 6 depicts an illustrative example of a process by which a user may replace one or more items in a list of items in accordance with at least some embodiments.

FIG. 6 depicts an illustrative example of a process by which a user may replace one or more items in a list of items in accordance with at least some embodiments. In FIG. 5, the process 600 is depicted as a number of example screenshots used to represent various points in the process 600. In particular, the process 600 is depicted via screenshots 602, 604, and 606. In this example, screenshot 602 depicts the screenshot 414 of FIG. 4.

In some embodiments, an initial list of items may be generated using the techniques described herein (e.g., with respect to FIG. 3 above). Once the list of items has been generated and presented to a user at 602, the user may be provided with the ability to replace an item 608 from the list of items. In some embodiments, the user may select a button or other mechanism associated with the item 608 in order to initiate the replacement process.

Once the replacement process has been initiated, the user may be presented with a number of potential alternative items as depicted in screenshot 604 via arrow 509. In some embodiments, the number of potential alternative items may consist of the potential items that were not selected for the item type during the selection of a most appropriate item for a particular item type in process 300 described above. In some embodiments, the potential alternative items may be ordered based on a weighted value assigned to each potential item during the item selection process. A weighted value for an item may be calculated in any suitable manner. For example, each item may be associated with a number of attributes (e.g., price, volume, rating, etc.) which may in turn be populated with a value. Each attribute may be assigned some weight based on that attribute's importance to a particular user of, or users in general of, the system. To calculate a weighted value in this example, the service provider may multiply each attribute value (or some value determined from that attribute value) by its weight. The weighted value may be the sum of each of those products. In some embodiments, the user may be given the ability to peruse the list of potential alternative items in order to make a selection. Once the user has selected a potential alternative item 610, the user may select a button or other mechanism associated with the item 610 to indicate to the service provider that the item 608 should be replaced with the item 610. Once the service provider has received this indication, the service provider may update the list to include the replacement item 610 as depicted in screenshot 606 via arrow 511.

In some embodiments, each time that a user elects to replace an item in the list of items presented to that user, the service provider may create and store a configuration setting 612 based on that replacement. That configuration setting may be used by the service provider to apply a filter for a subsequently received list of item types. For example, upon receiving a second request for a list of items, the service provider may automatically present item 610 in lieu of item 608 if the second list would have otherwise included item 608. In some embodiments, the service provider may assign a greater weight to one or more attributes of the alternative item that was selected. For example, if the only difference between item 608 and item 610 is that item 610 is an "organic" version of item 608, then the service provider may store an indication that this user prefers organic items.

Figure 7:
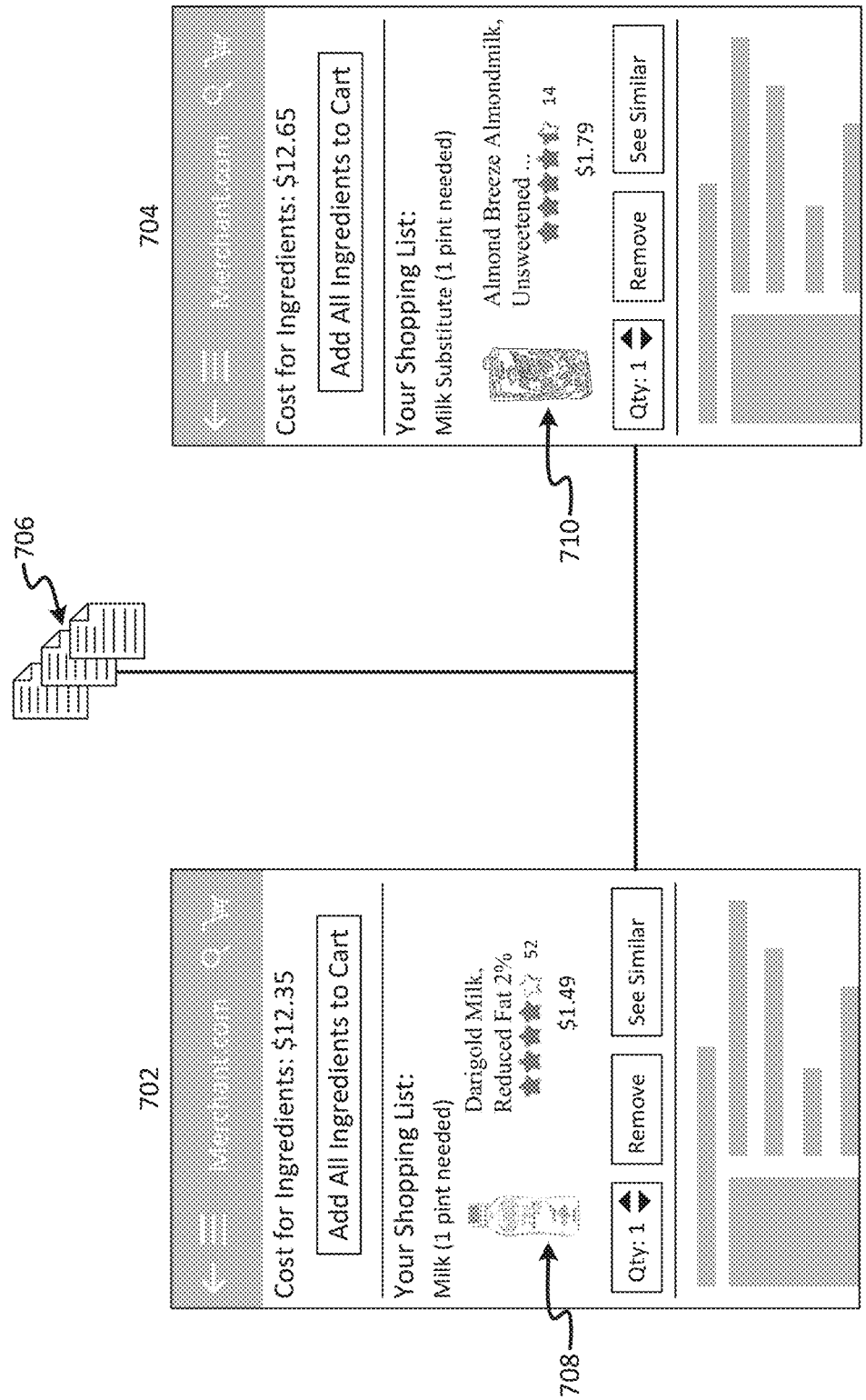
FIG. 7 depicts an illustrative example of a process by which one or more items in a list of items may be selected using configuration settings in order to customize the list of items in accordance with at least some embodiments.

FIG. 7 depicts an illustrative example of a process by which one or more items in a list of items may be selected using configuration settings in order to customize the list of items in accordance with at least some embodiments. In FIG. 7, example screenshots are used to represent alternative outcomes of an item selection process. In particular, the description of FIG. 7 is illustrated via screenshots 702 and 704.

In some embodiments, a list of item types may be provided to the service provider with respect to two different users. As will become apparent, different items may be presented with respect to the provided list of item types based on which user is presented to. For example, a first screenshot 702 may depict a different set of items than a second screenshot 704 by virtue of being associated with a different user. It should be noted that although the description references two different users, each of the screenshots 702 and 704 may pertain to the same user. For example, the screenshot 702 may depict a version of the item list that may be presented if a user is not logged into an account whereas the screenshot 704 may depict a version of the item list that may be presented if the user is logged into the account.

In some embodiments, the service provider may store a number of configuration settings 706 with respect to each account that it maintains. In some non-limiting examples, the configuration settings 706 may include user preference settings, item-restrictions (e.g., dietary restrictions), item aversions (e.g., food allergies), or any other suitable criteria that may be used for item selection. In some embodiments, the service provider may derive one or more configuration settings for an account from a purchase history for that account. For example, the service provider may determine a typical price range, rating level, version, or other item attribute that the user prefers based on his or her past purchases. In some embodiments, the service provider may generate configuration settings based on one or more attributes of a user. For example, the service provider may generate a configuration setting that prevents the user from being offered age-restricted items if the user is under age.

In the first screenshot 702, the configuration settings 706 for a first user account may be applied to a first item type of the list of item types, and may result in the selection of a first item 708. In the second screenshot 704, the configuration settings 706 for a second user account may be applied to the same first item type of the list of item types, and may result in the selection of a second item 710. In this example, the only difference between the first user and the second user may be the configuration settings 706 associated with the respective user's account. For example, if the item type is "milk" then the first user (having no restrictions on milk products) may be offered a first milk product 708. However, the second user may be lactose intolerant and may have a configuration setting associated with his or her account that indicates that milk products should be replaced with lactose-free versions of those products. Hence, the second user may be presented a milk substitute product 710.

Figure 8:
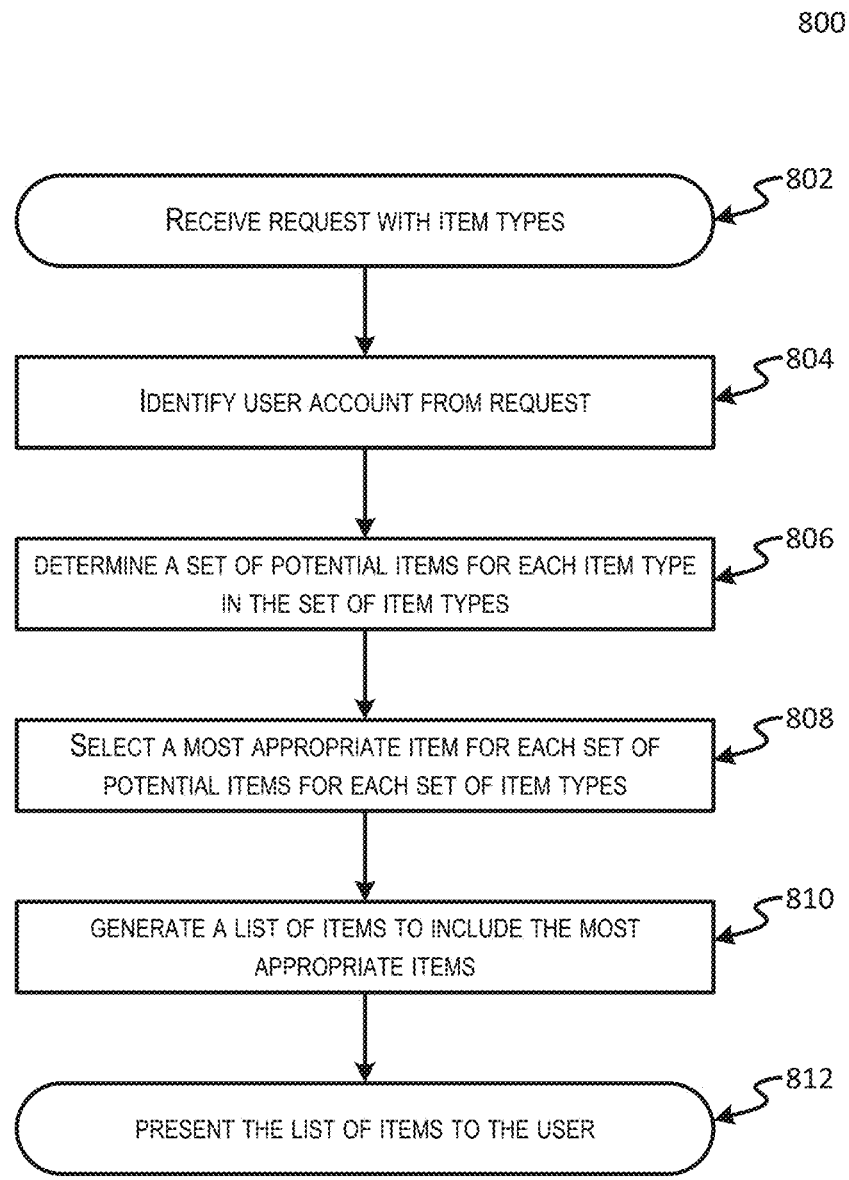
FIG. 8 depicts a flow diagram illustrating an example process for generating and presenting a list of items from a link in accordance with at least some embodiments.

FIG. 8 depicts a flow diagram illustrating an example process for generating and presenting a list of items from a link in accordance with at least some embodiments. In accordance with at least some embodiments, the process 800 may be performed by the service provider 206 described with respect to FIG. 2.

Process 800 may begin at 802, when a request is received for a list of items. In some embodiments, the request may include a set of item types. The set of item types may be included in a single line of text (e.g., within a link). In some embodiments, the request may also include a quantity for each item type in the set of item types. An indication of a geographic location may be derived from the received request. For example, an internet protocol (IP) address may be derived from the received request, which may be processed to identify a geographic location from which the request originated.

At 804, the process may involve identifying a user account from which the request has been received. In some embodiments, the request may be received from a user device which has been used to access a resource provided by a service provider (e.g., via a browser application). In at least some of these embodiments, the user device may include a cookie (e.g., a browser or internet cookie) that includes an indication of the user's identity or an account associated with the user. In some embodiments, an identifier associated with the user device used to access the resource may be associated with a particular user or user account. In some embodiments, the user may be asked to log into an account maintained by a service provider at some point during the process 800. Once the user account has been identified, configuration settings stored in association with that user account may be retrieved.

At 806, the process may involve determining a set of potential items for each item type in the set of item types. In some embodiments, this may involve identifying each of the items in an electronic catalog that fall within a category described by the item type. As described above, the service provider may be an electronic retailer that maintains an electronic catalog of items that are available for purchase from the electronic retailer. The set of potential items may be limited to only those items offered for purchase by the electronic retailer. In some embodiments, the service provider may provide a notification that one or more item types from the set of item types is not available. In some embodiments, the set of potential items may be limited to only those potential items which are available to the requesting user. For example, items that are not available in the user's geographic location may not be added to a list of potential items.

At 808, the process may involve selecting a most appropriate item from each set of potential items. In some embodiments, this may involve assigning weights to each of the potential items in the set of potential items based on one or more attributes associated with the potential items. For example, items may be weighted according to price, rating, quantity, geographic origin, expiration date, or any other suitable attribute of the item. In some embodiments, the most appropriate item may be the most commonly purchased item from the set of potential items.

At 810, the process may involve generating a list that includes each of the most appropriate items for each item type in the set of item types. In some embodiments, the list may be formatted as a list of products available for purchase from the service provider. The list may include a number of details about each of the items. For example, the list may include a picture of the item, a description of the item, a price of the item, a number of the item which are available, a rating of the item, or any other suitable information related to the item. In some embodiments, the list may include links to webpages dedicated to a particular item. For example, the list may include, for each item in the list, a link to a product webpage for that item that includes a number of additional details.

At 812, the process may involve providing the list of most appropriate items to the user device from which the request was received. In some embodiments, the user device may display the list to a user of the user device. Additionally, the user may be given the ability to complete a transaction for one or more of the items in the list of items. In some embodiments, the user may be given the ability to replace one or more items in the list of items with an alternative item. This is described in greater details with respect to FIG. 5 above. In some embodiments, if the user elects to replace an item with an alternative item, the process may further involve generating a configuration setting that indicates the user's preference for the alternative item, wherein the configuration setting may be used to filter out potential items in a second list of item types subsequently received with respect to the user account.

Figure 9:
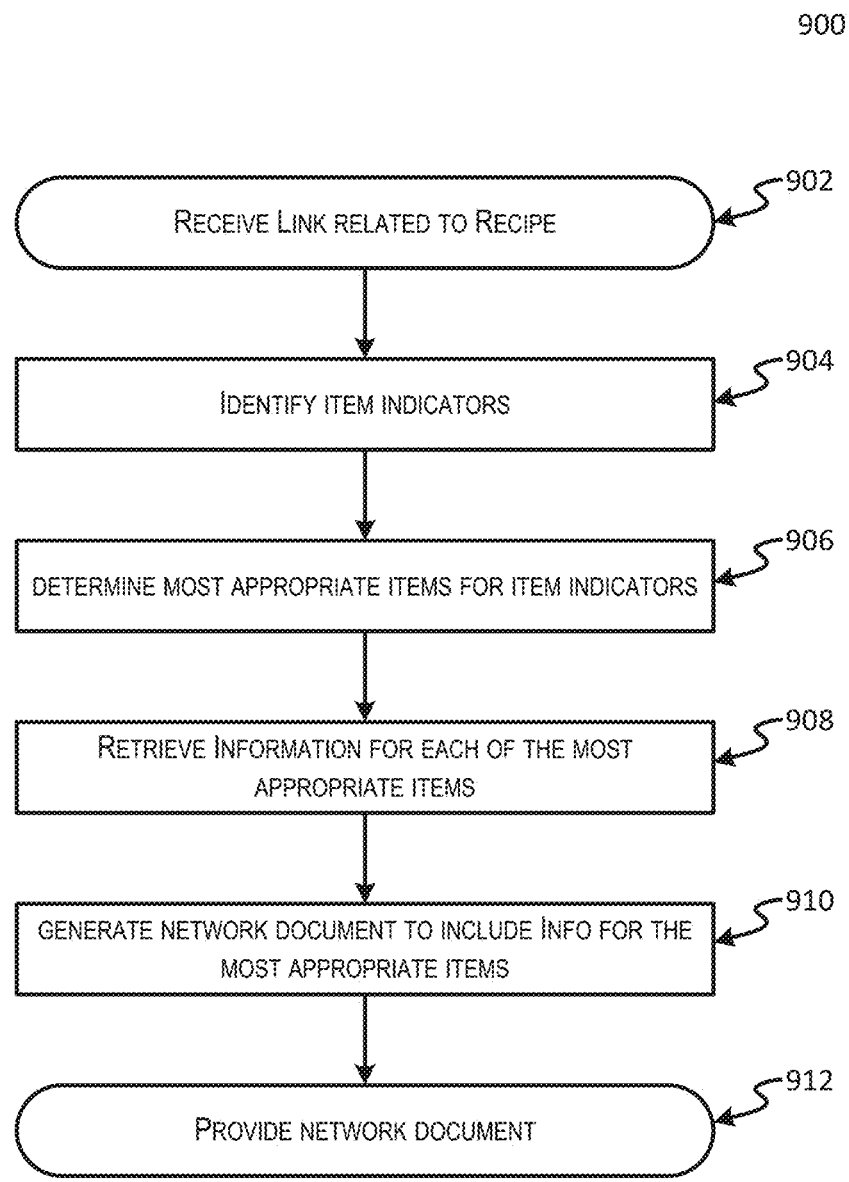
FIG. 9 depicts a flow diagram illustrating an example process for generating a network document in accordance with at least some embodiments.

FIG. 9 depicts a flow diagram illustrating an example process for generating a network document in accordance with at least some embodiments. In accordance with at least some embodiments, the process 900 may be performed by the service provider 206 described with respect to FIG. 2.

Process 900 may begin at 902, when a link is used to access a service provided by a service provider. In some embodiments, the link may be selected by a user with respect to a particular recipe. For example, a visitor to a website that includes a recipe may also include a link as described. The visitor may select an option to activate the link and may be directed to the service described herein via that link. For example, upon selection of an option to purchase ingredients, a browser application that the website visitor is using may be provided with the link as a URL. In this example, the browser application may attempt to access the service herein via that URL. As described elsewhere, the link may include at least a domain which indicates a service provider and a list of item type indicators. In some embodiments, each one of the item type indicators in the list of item type indicators may indicate a type of item in the recipe associated with the request.

Upon receiving an indication of the link, the process may involve identifying a number of item indicators in the link at 904. As described elsewhere, the number of item indicators may be formatted as a list of item types. Each of the item indicators may include additional information that may be used to select a most appropriate item for that item type. Upon receiving each item indicator, the system may run a search for items of the indicated type using one or more terms of the additional information provided. In some embodiments, the system may identify the top X search results as potential items, where X is some predetermined threshold. For example, upon receiving an item indicator that indicates an item type of "flour," the system may conduct a search for flour and identify the top 10 flour-related search results as potential items.

At 906, the process may involve identifying a most appropriate item for each of the item indicators. The most appropriate item may be selected from a list of potential items identified at 904. In some embodiments, upon conducting a search for an item indicator that results in returning a list of potential items, the system may assign a weight to one or more of the potential items in order to select a most appropriate item based on attributes of the potential items and/or based on configuration settings associated with the requester. For example, once each of the items has been assigned a weighted value, the items in the list of potential items may be reordered based on their respective weighted values. The system may then identify the top (most relevant) result from the list of potential items.

At 908, the process may involve retrieving information stored in association with each of the most appropriate items. For example, the system may, upon identifying a most appropriate item for an item indicator, retrieve one or more attribute values stored in association with that most appropriate item. For example, each of the potential items in the list of potential items may be an item in an electronic catalog maintained by an electronic retailer. In this example, each item may be associated with a price, an image, a description, a rating, or any other suitable information. The system may retrieve at least a portion of this information to be presented with respect to the item.

At 910, the process may involve generating a network document to include each of the most appropriate items for each of the item indicators as well as the information retrieved with respect to each of those most appropriate items. For example, the system may generate a network document that depicts each of the most appropriate items, a price associated with that item, and any other suitable information. The network document may also include some mechanism for obtaining the item. For example, next to each item in the network document, the system may provide a button that, when selected, causes the item to be placed into a virtual shopping cart. In some embodiments, the network document may include a mechanism which enables each of the most appropriate items to be placed into a virtual shopping cart at once.

At 912, the process may involve providing the network document to the entity from which the request was received. In some embodiments, this may involve serving the network document to the browser application from which the link was received so that it can be displayed on a display of a client device on which the browser application is running.

Embodiments of the disclosure provide for a number of advantages over conventional systems. For example, embodiments of the disclosure enable each user that requests a set of item types to receive a customized list of items. In embodiments of the disclosure, this enables each user to receive only content that is relevant to that user's needs or preferences without any further action by that user. Additionally, the system is more efficient than conventional systems in that a user can quickly obtain a number of items without having to search for his or her preferred versions of those items. This, in turn, enables the user to more quickly complete his or her transactions. Furthermore, there are a number of other advantages which are recognized by embodiments of the disclosure. For example, in the scenario in which the list of items are ingredients for a recipe, embodiments of the disclosure may automatically adjust to a user's dietary restrictions and/or allergens, such that the user is not offered ingredients that the user is allergic to. Hence, embodiments of the disclosure can significantly reduce the amount of time that a user spends researching ingredients to use in a recipe. Additionally, embodiments of the disclosure provide a convenient mechanism for providing access to a list of items. This convenient mechanism can increase the attractiveness of a third party website that implements it, encouraging a larger number of customers to use the third party website.

Figure 10:
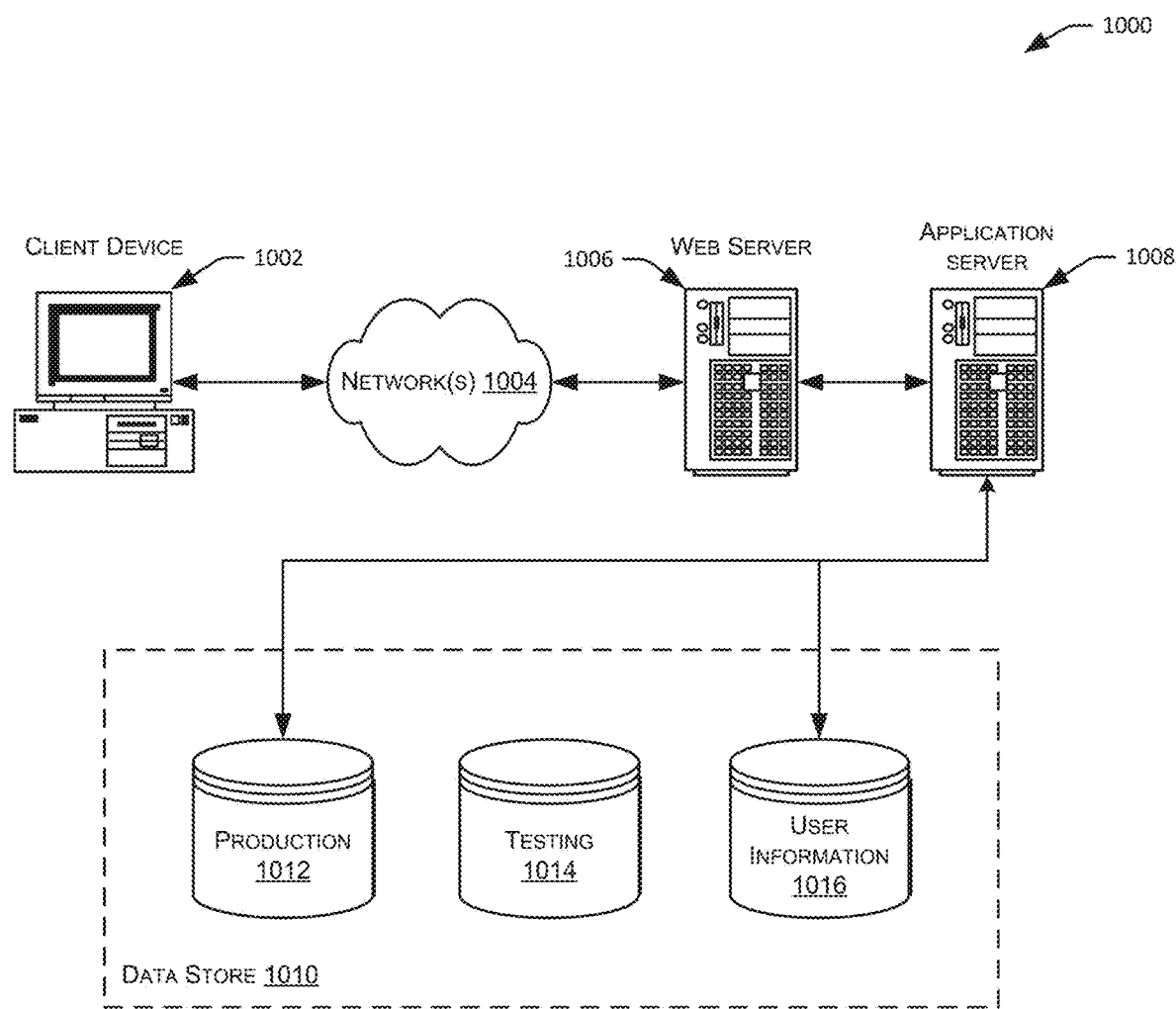
FIG. 10 illustrates aspects of an example environment for implementing aspects in accordance with various embodiments.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily, implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly, contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. AR methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system of a service provider from a user device, a request for a customized list of items, the request including: (i) a uniform resource locator (URL) address that embeds a set of item types using a JavaScript Object Notation (JSON) format, the URL address having redirected the user device from a third-party website to a website of the service provider, and (ii) an account identifier obtained from an Internet cookie stored on the user device;
identifying, by the computer system, an account associated with the user device and stored by the computer system of the service provider, the identifying based at least in part on the account identifier included in the request;
identifying, by the computer system and in accordance with the JSON format, the set of item types by at least parsing the URL address;
determining, by the computer system, for each item type in the set of item types, a set of potential items that is filtered from items maintained in an electronic catalog of the service provider based at least in part on each of the potential items in the set of potential items conforming to information associated with the account;
selecting, by the computer system, for each set of potential items for each set of item types, a most appropriate item;

generating, by the computer system, the customized list of items to include the most appropriate items selected for each set of item types; and providing, by the computer system to the user device, the customized list of items for presentation via the website of the service provider.

2. The computer-implemented method of claim 1, wherein the request also includes at least a quantity for each item type in the set of item types, the set of potential items for each item type being filtered based at least in part on the quantity.

3. The computer-implemented method of claim 1, further comprising determining, by the computer system, a geographic location of the user device based at least in part on information included in the request, the set of potential items for each item type being filtered based at least in part on the geographic location of the user device.

4. The computer-implemented method of claim 1, wherein each of the potential items in the set of potential items is assigned a weighted value.

5. The computer-implemented method of claim 4, where the most appropriate item is selected for each set of potential items based at least in part on the weighted values.

6. The computer-implemented method of claim 1, further comprising:

receiving, by the computer system, a request to complete a transaction for at least one most appropriate item of the customized list of items; and initiating, by the computer system, the transaction for the at least one most appropriate item.

7. The computer-implemented method of claim 1, further comprising:

receiving, by the computer system, a request to replace at least one most appropriate item of the customized list of items, the request including an indication of an alternative item; and replacing, by the computer system, the at least one most appropriate item with the alternative item in the customized list.

8. The computer-implemented method of claim 7, further comprising:

storing, by the computer system, a configuration setting with respect to the user device that indicates a preference toward the alternative item.

9. The computer-implemented method of claim 8, wherein the configuration setting is used by the computer system to apply a filter for a subsequently received list of item types.

10. The computer-implemented method of claim 1, wherein items of the set of item types are respectively associated with one or more item type indicators, the one or more item type indicators comprising a series of JavaScript Object Notation data objects.

11. The computer-implemented method of claim 10, wherein the series of JavaScript Object Notation data objects include one or more of a quantity, an item override value, a brand indicator, or a staple flag.

12. The computer-implemented method of claim 10, wherein the one or more item type indicators comprise plain word keywords.

13. The computer-implemented method of claim 1, wherein information pertaining to the most appropriate item comprises at least prices for the most appropriate item.

14. The computer-implemented method of claim 1, wherein the set of item types is received within a link, and wherein the link is received upon activation of a mechanism on a separate network document.

15. The computer-implemented method of claim 10, wherein the one or more item type indicators correspond to content displayed upon a separate webpage.

\* \* \* \* \*